No. 778,162. PATENTED DEC. 20, 1904.
E. C. WULLE.
DIAGRAM SYSTEM FOR TEACHING EMBROIDERY.
APPLICATION FILED SEPT. 10, 1903.
NO MODEL. 2 SHEETS—SHEET 1.

WITNESSES: INVENTOR
Ella C. Wulle
BY
Attorney

No. 778,162. PATENTED DEC. 20, 1904.
E. C. WULLE.
DIAGRAM SYSTEM FOR TEACHING EMBROIDERY.
APPLICATION FILED SEPT. 10, 1903.
NO MODEL. 2 SHEETS—SHEET 2.
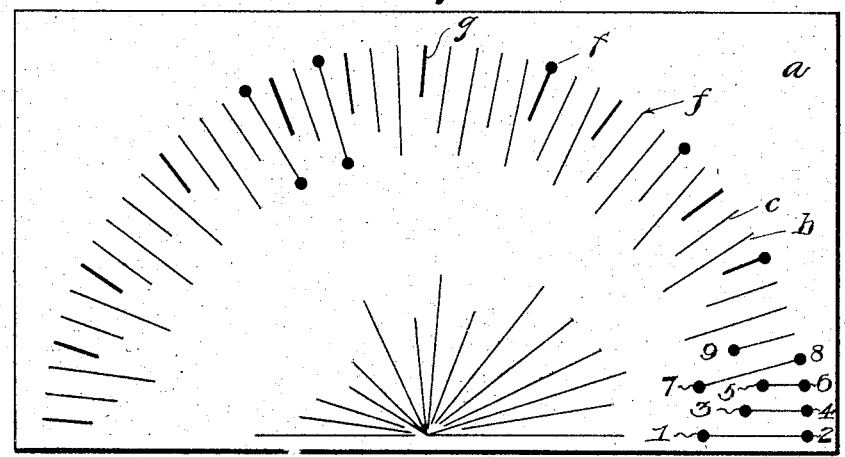
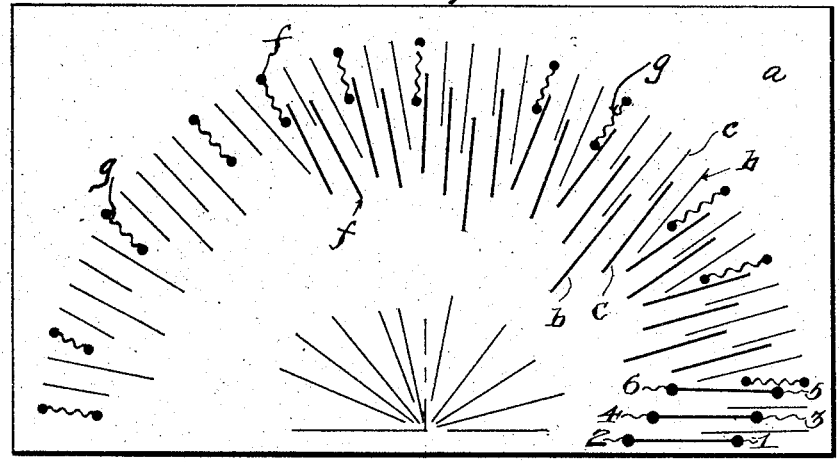
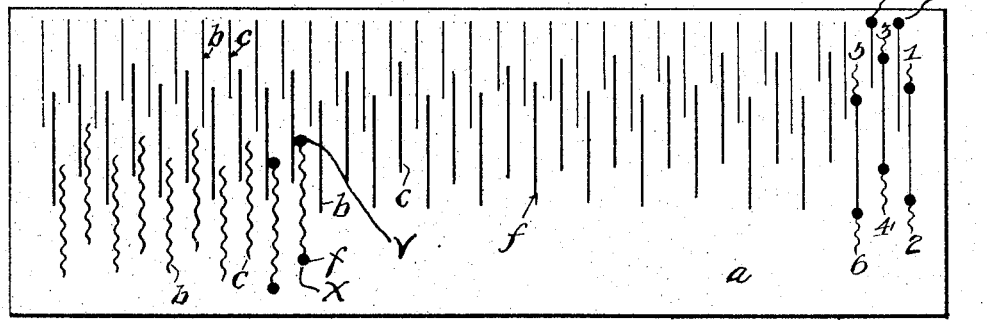
WITNESSES:
J. L. Mordaine
G. V. Forbes.
INVENTOR
Ella C. Wulle.
By D. T. Wolhaupter
Attorney No. 778,162. Patented December 20, 1904.

UNITED STATES PATENT OFFICE.

ELLA C. WULLE, OF MANSFIELD, OHIO.

DIAGRAM SYSTEM FOR TEACHING EMBROIDERY.

SPECIFICATION forming part of Letters Patent No. 778,162, dated December 20, 1904.

Application filed September 10, 1903. Serial No. 172,580.

*To all whom it may concern:*

Be it known that I, ELLA C. WULLE, a citizen of the United States, residing at Mansfield, in the county of Richland and State of Ohio, have invented certain new and useful Improvements in Diagram Systems for Teaching Embroidery, of which the following is a specification.

This invention relates to the art of embroidery, and has special reference to a simple, practical, and effectual system of teaching the same accurately and expeditiously.

To this end the invention contemplates a system of teaching embroidery that can be utilized for giving instruction either orally or written. In this connection the invention has in view a system of outlining, designating, and guiding the stitches to be made, whereby the beginner may readily acquire with rapidity a fundamental understanding of the art of embroidery and quickly adapt the same to the working of various figures and designs. In the accomplishment of this result the elementary features of the system may be embodied in diagrams printed upon charts from which oral instruction is to be given or embodied in diagrams printed directly upon the muslin or other material to be embroidered in connection with suitable accompanying printed instructions.

With these and other objects in view the invention consists in the novel combination and arrangement of diagrams hereinafter more fully described, illustrated, and claimed.

The essential feature of the invention involved in the elementary arrangement of the outlining, designating, and guiding marks is necessarily susceptible to embodiment in a variety of modifications and designs without departing from the scope of the invention; but for illustrative purposes a few of the more elementary and distinctive diagrams are shown in the accompanying drawings, in which—

Figure 1:
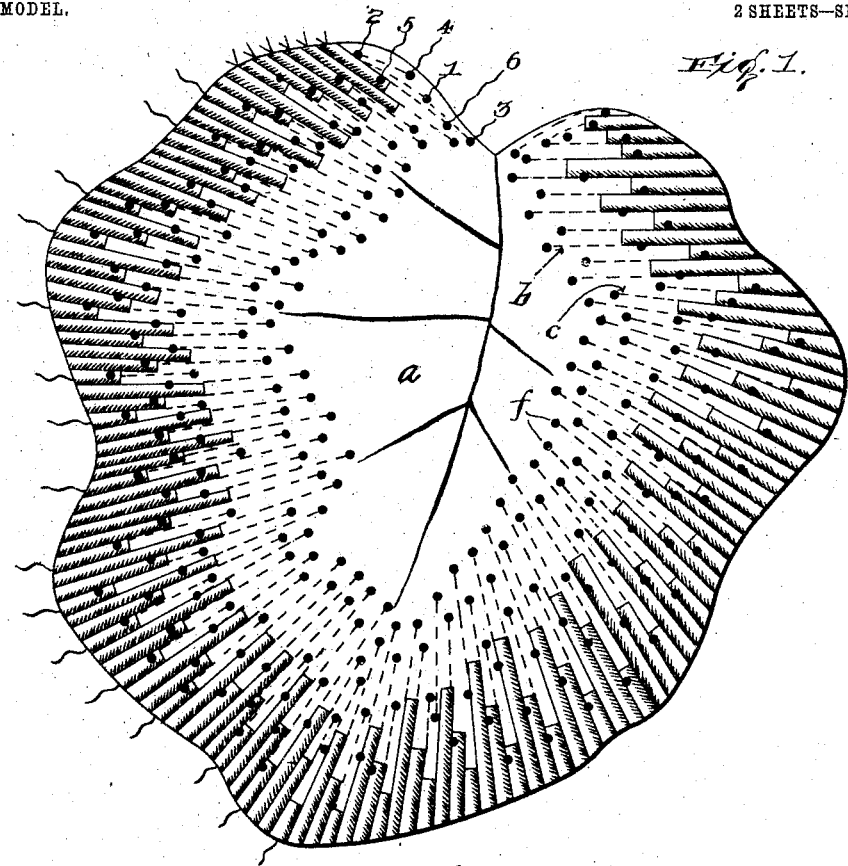
Figure 2:
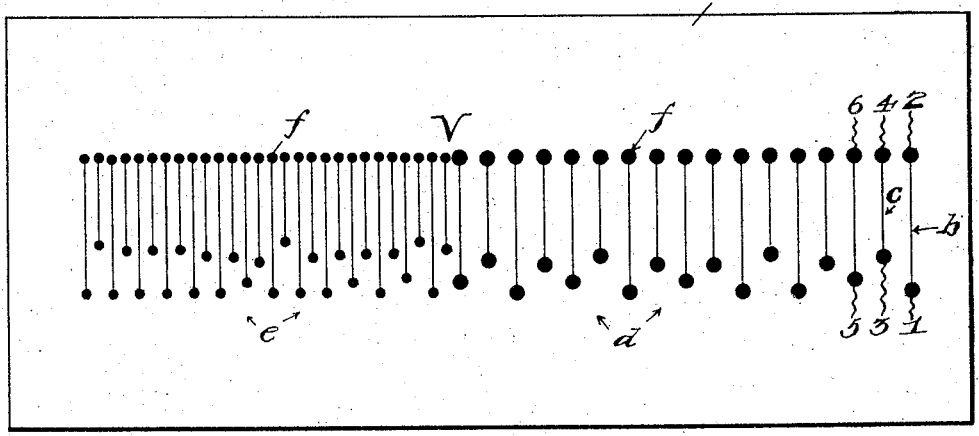

Figure 1 is a plan view showing a piece of advanced work in the form of a leaf and having thereon a diagram embodying the present invention. Fig. 2 is a plan view of a chart embodying the invention in its elementary form. Fig. 3 is a similar view of a chart, showing a form of the diagram adapted for teaching the embroidering of flower leaves or designs which require narrowing. Fig. 4 is a similar view of a chart embodying an arrangement of a diagram intended to teach how to join the second or shading row in the narrowing process. Fig. 5 is a similar view of a chart embodying the same general diagram as shown in Fig. 2, but illustrating how to apply the second row for shading purposes.

Like references designate corresponding parts in the several figures of the drawings.

In carrying out the invention the same idea is preserved whether the diagrams are embodied upon wall or similar charts for teaching orally or whether designed to be printed directly upon the muslin or other material to be embroidered and to be followed in connection with printed instructions, in all cases the pupil being required to cover certain outlining-marks and to be guided through the medium of properly-arranged designations, each intended to subserve its own function.

Referring particularly to the illustrations of the invention shown in the drawings, the same involve as an elementary feature thereof a sequence or succession of stitch-marking lines in connection with guiding designations bearing a sequential relation to provide for the accurate positioning of the embroidery-stitch.

In its elementary aspect the invention is shown in the diagram illustrated in Fig. 2 of the drawings, which shows a chart or diagram surface *a*, having the diagram which is usually employed as the first lesson in the system. This diagram essentially consists of a continuous row or series of regularly-spaced stitch-marking lines *b* and *c*, which are designed to be covered by the pupil and which define not only the position, but also the extent of the stitch to be taken. Also it will be observed that the row or series of lines are made up of long and short lines *b* and *c*, respectively, which are arranged in a continuously-alternating order. These alternately long and short stitch marking or defining lines are so arranged that their terminals at one end lie in the same pattern contour-line, while those at the opposite end are in staggered relation, as plainly shown in Fig. 2. The same diagram may show different widths or spacing between the stitch marking or defining lines, such as the group $d$, embodying a wide spacing of the lines, and the group $e$ in the same row, but embodying a narrow spacing for teaching the gradation from wide to narrow stitching.

Referring to the same diagram—namely, that shown in Fig. 2—it is to be observed that at the ends of each of the stitch marking or defining lines there is provided on the chart or diagram surface what may be termed "terminal insert-points" $f$, which indicate the exact point or position where the needle is to be inserted by the pupil, these terminal insert-points being usually in the form of dots, as shown. However, they may consist of dashes or simply be the ends of the stitch marking or defining line, as shown in some of the diagrams. The said terminal insert-points bear a definite relation one to the other. This relation varies widely, according to the character of the embroidering, and hence in all instances are designated by guiding characters arranged in sequential order. These guiding characters may consist of any suitable definite designation, but are preferably numerals and letters, such as suggested in Fig. 2, wherein the first few insert-points are designated, respectively, by the numerals "1," "2," "3," "4," "5," and "6," which are arranged in the positions to be followed by the pupil in inserting the needle and covering the stitch marking or defining lines $b\,c$. Also in the same diagram a distinctively different guiding character may be employed—such, for instance, as the letter V in the position shown in Fig. 2—to bring out, for instance, the result of changing the direction of the stitches and to accentuate the point where a narrowing down is to occur. The same features are embodied in all of the diagrams irrespective of the designs which the same are intended to follow or the complication of the embroidery. Other features, however, are added to different diagrams. For instance, that shown in Fig. 3 is intended to teach the embroidering of flower leaves or designs which require narrowing. The diagram in this illustration is arranged on the arc of a circle and not only includes the alternate long and short lines $b\,c$, but also an extra short-stitch marking or defining line $g$, arranged somewhat oblique, and yet retaining the general radial direction of the other stitch marking or defining lines.

Furthermore, as illustrative of the added features which are incorporated in the different designs, Fig. 4 shows a diagram intended to teach the joining of the second or shading row in the narrowing process. As illustrated, this diagram includes separate concentric rows of stitch marking or defining lines and also includes the extra short-stitch marking or defining line $g$, which may be straight, as shown in Fig. 3, or wavy, as shown in said Fig. 4.

This arrangement of the stitch marking or defining lines in separate rows may be carried out indefinitely, and, as shown in Fig. 5, the lines in the different rows may be of a distinguishing character—such as light, heavy, and wavy—to more clearly impress the pupil with the separate identity of the several rows. In the diagram shown in Fig. 1 the first or outer row of stitches is illustrated as filled in, but exposing the inner row of stitch marking or defining lines to show the progress of the work toward the center of the diagram surface or design and also to illustrate the overlapping relation of the individual lines in the separate rows. These ideas may be varied *in extenso*, according to the character of design wished to be embroidered through the medium of outlining, designating, and guiding marks such as contemplated by the present invention.

To explain more definitely the method pursued in carrying out the system, reference is made to the elementary diagram shown in Fig. 2. Following this diagram the pupil will proceed to cover the stitch marking or defining lines by first bringing the needle up through the insert-point "1," insert through point "2," up through point "3," insert in point "4," up through point "5," insert through point "6," &c. This is continued throughout the diagram with the result of producing a straight row of long and short stitches. The same method is pursued in connection with the diagram shown in Fig. 5, wherein the first row of lines is the same as in Fig. 2. However, in this diagram A B designate the first two stitches, and the second row is generally intended for shading and is worked in the same manner as the first row. The guiding characters or designations are followed in order of their sequence, and the pupil continues across the diagram, covering each line in rotation. As illustrated in Fig. 5, the second row is a trifle heavier or darker, while the designations V X, in connection with wavy lines, mark out the third row. In this connection it is of course obvious that when more rows are necessary to fill a given space different marks and lines can be utilized.

In the diagram shown in Fig. 3 the same is intended to illustrate the long and short stitch required for such flowers, leaves, and designs that have a wide or full edge, such as nasturtiums, morning-glory leaves, flower geranium, &c. The extra short stitch $g$ in this diagram is very important and indicates a change in the direction of stitch which is provided by its use. The work on said diagram in Fig. 3 is done in the same manner as previously described.

The diagram of Fig. 4 is the same on the edge as the diagram shown in Fig. 3, but provides for an additional row of stitches, such as contemplated by the straight form of diagram shown in Fig. 5.

From the foregoing it is thought that the essential features and method of using the herein-described system will be readily apparent without further description, and it will be understood that various changes in the form, proportion, and arrangement of parts may be resorted to without departing from the spirit or sacrificing any of the advantages thereof.

Having thus described my invention, what I claim as new, and desire to secure by Letters Patent, is—

1. An embroidery system of the class described, comprising a diagram-surface provided with a row of long and short stitch-marking lines, running in approximately the same direction and arranged with their terminals at one end disposed in staggered relation, said diagram-surface also being provided with insert-points, indicated at the terminals of the lines, and a sequence of guiding characters associated with such points.

2. An embroidery system of the class described, comprising a diagram-surface having a series of overlapping sets of stitch-marking lines, each set embodying rows of alternating long and short marking-lines following the contour of the figure to be embroidered and having their terminals at one end disposed in staggered relation, insert-points indicated at the terminals of said lines, and a sequence of guiding characters associated with such points.

In testimony whereof I affix my signature in presence of two witnesses.

ELLA C. WULLE.

Witnesses:
 JOHN W. BAKER,
 S. M. DOUGLASS.